US012748675B2

(12) United States Patent
Huang

(10) Patent No.: US 12,748,675 B2
(45) Date of Patent: Sep. 29, 2026

(54) QUANTUM COMPUTATION

(71) Applicant: Z-AXIS PTE. LTD., Singapore (SG)

(72) Inventor: Jiachen Huang, San Mateo, CA (US)

(73) Assignee: Z-AXIS PTE. LTD., Singapore (SG)

( * ) Notice: Subject to any disclaimer, the term of this patent is extended or adjusted under 35 U.S.C. 154(b) by 907 days.

(21) Appl. No.: 17/804,673

(22) Filed: May 31, 2022

(65) Prior Publication Data

US 2024/0004773 A1 Jan. 4, 2024

(51) Int. Cl.
*G06N 10/20* (2022.01)
*G06F 11/34* (2006.01)

(52) U.S. Cl.
CPC ...... *G06F 11/3428* (2013.01); *G06F 11/3452* (2013.01); *G06N 10/20* (2022.01)

(58) Field of Classification Search
CPC .. G06F 11/3428; G06F 11/3452; G06N 10/20
See application file for complete search history.

(56) References Cited

U.S. PATENT DOCUMENTS

| | | | | |
|---|---|---|---|---|
| 10,469,087 | B1 * | 11/2019 | Granade | G06N 10/70 |
| 2005/0133780 | A1 * | 6/2005 | Azuma | G06N 10/70 257/13 |
| 2017/0286858 | A1 * | 10/2017 | La Cour | G06N 10/80 |
| 2018/0046933 | A1 * | 2/2018 | La Cour | G06F 12/023 |
| 2018/0053070 | A1 * | 2/2018 | Pavek | G06F 18/2415 |
| 2019/0007051 | A1 * | 1/2019 | Sete | H03K 19/195 |

FOREIGN PATENT DOCUMENTS

| | | | |
|---|---|---|---|
| CN | 114026576 | A | 2/2022 |
| CN | 114298317 | A | 4/2022 |
| JP | 2020080173 | A | 5/2020 |

OTHER PUBLICATIONS

First Office Action issued in corresponding Chinese Application No. 202310452261.6 on Dec. 20, 2024, (6 pages).
Liu et al., "Quantum fidelity based on magnetic resonance force microscopy system," Chinese Journal of Quantum Electronics, vol. 30, No. 2, 2013, 180, (translation of abstract only).
Huang et al., "Towards ultra-high fidelity quantum operations: SQiSW gate as a native two-qubit gate," arXiv, 2021, 29 pages.

* cited by examiner

*Primary Examiner* — Lina Cordero
*Assistant Examiner* — Lynda Dinh
(74) *Attorney, Agent, or Firm* — The Sun IP Law

(57) ABSTRACT

A system including a quantum component and a classical component, the classical component including a compilation module and a quantum controller can be configured to perform obtain a task and perform a quantum computation. The task can specify a set of basis functions defined over an input domain and a selection of a set of quantum gates, the quantum gates being defined over an input domain. Performance of the quantum computation can include determining, by the compilation module, first sequences of quantum gates, applying, by the quantum controller, the first sequences of quantum gates to the quantum component, measuring, by the quantum controller, resulting state information of the quantum component for the first sequences of quantum gates, and providing the resulting state information.

23 Claims, 6 Drawing Sheets

300

QUANTUM COMPUTATION

TECHNICAL FIELD

The present disclosure generally relates to quantum computing, and more particularly, to a benchmarking protocol that generates an approximate fidelity function for a set of gates.

BACKGROUND

Quantum computing can address classically intractable computational problems. However, existing quantum computational devices are limited by various sources of error and imprecision. Benchmarking can be used to determine the fidelity of a set of gates implemented on a quantum computational device. However, conventional benchmarking techniques may be impractical when a set of gates contains a large number of gates. Furthermore, benchmarking a particular selection of gates may be infeasible. A finite gate set may be too large for characterization by benchmarking individual gates. A continuous gate set can be characterized by benchmarking gates sampled from the continuous gate set, but this approach can become unfeasible when the continuous gate set lies on a high-dimensional manifold. Improved benchmarking techniques may enable identification of gate sets or quantum computational devices having superior fidelity, thus supporting the development of quantum computing.

SUMMARY

The disclosed systems and methods relate to methods for generating approximate fidelity functions for a set of quantum gates by sampling from the set, during benchmarking, according to a distribution. This distribution can be generated using one of a set of basis functions.

The disclosed embodiments include a method of benchmarking a set of quantum gates. The method can include selecting a set of quantum gates, the quantum gates being defined over an input domain. The method can further include determining an approximate fidelity function for the set of quantum gates. The determination can include selecting a set of basis functions defined over the input domain. The determination can further include generating a first probability distribution defined over the input domain using one of the set of basis functions. The determination can further include obtaining, by performing randomized benchmarking on a quantum component, a fidelity measure for the set of quantum gates under the first probability distribution. The approximate fidelity function can be a function of the fidelity measure and the one of the set of basis functions. The method can include providing the approximate fidelity function.

In some embodiments, obtaining the fidelity measure can include scaling a first fidelity value for an interleaved sequence of quantum gates by a second fidelity value for an un-interleaved sequence of quantum gates. In some embodiments, performing randomized benchmarking on the quantum component can include determining a first fidelity value for first sequences of quantum gates. Each of the first sequences can interleave a sequence selected from the set of quantum gates according to the at least one first probability distribution, and a sequence selected from a group of quantum gates according to a second probability distribution. In some embodiments, the second probability distribution can be a uniform probability distribution over the input domain. In some embodiments, the set can be a subset of a group of quantum gates. In some embodiments, the set of basis functions can include a set of trigonometric basis functions; a set of polynomial basis functions; or a set of wavelet basis functions. In some embodiments, the approximate fidelity function comprises two or more terms of a Fourier, Taylor, or wavelet expansion of a fidelity function of the set of quantum gates on the quantum component. In some embodiments, the input domain includes two or more variables. In some embodiments, the quantum component can include a transmon or fluxonium qubit.

The disclosed embodiments include a system for benchmarking a set of quantum gates. The system can include at least one processor and at least one non-transitory computer-readable medium containing instructions. When executed by the at least one processor, the instructions can cause the system to perform operations. The operations can include selecting a set of quantum gates, the quantum gates defined over an input domain. The operations can further include determining an approximate fidelity function for the set of quantum gates. The determination can include selecting a set of basis functions defined over the input domain. The determination can further include generating a first probability distribution defined over the input domain using one of the set of basis functions. The determination can further include obtaining, by performing randomized benchmarking on a quantum component, a fidelity measure for the set of quantum gates under the first probability distribution. The approximate fidelity function can be a function of the fidelity measure and the set of basis functions. The operations can further include providing the approximate fidelity function.

In some embodiments, obtaining the fidelity measure can include scaling a first fidelity value for an interleaved sequence of quantum gates by a second fidelity value for an un-interleaved sequence of quantum gates. In some embodiments, performing randomized benchmarking on the quantum component can include determining a first fidelity value for first sequences of quantum gates. Each of the first sequences can interleave a sequence selected from the set of quantum gates according to the at least one first probability distribution and a sequence selected from a group of quantum gates according to a second probability distribution. In some embodiments, the set can be a subset of a group of quantum gates. In some embodiments, the set of basis functions can include a set of trigonometric basis functions; a set of polynomial basis functions; or a set of wavelet basis functions. In some embodiments, the approximate fidelity function can include two or more terms of a Fourier, Taylor, or wavelet expansion of a fidelity function of the set of quantum gates on the quantum component. In some embodiments, the quantum component can include a transmon or fluxonium qubit.

The disclosed embodiments include a non-transitory computer-readable medium containing instructions. When executed by at least one processor of a system, the instructions can cause the system to perform operations. The operations can include selecting a set of quantum gates, the quantum gates defined over an input domain. The operations can further include determining an approximate fidelity function for the set of quantum gates. The determination can include selecting a set of basis functions defined over the input domain. The determination can further include generating a first probability distribution defined over the input domain using one of the set of basis functions. The determination can further include obtaining, by performing randomized benchmarking on a quantum component, a fidelity measure for the set of quantum gates under the first probability distribution. The approximate fidelity function can be a function of the fidelity measure and the one of the set of basis functions. The operations can include providing the approximate fidelity function.

In some embodiments, obtaining the fidelity measure can include scaling a first fidelity value for an interleaved sequence of quantum gates by a second fidelity value for an un-interleaved sequence of quantum gates. In some embodiments, performing randomized benchmarking on the quantum component can include determining a first fidelity value for first sequences of quantum gates. Each of the first sequences can interleave a sequence selected from the set of quantum gates according to the first probability distribution, and a sequence selected from a group of quantum gates according to a second probability distribution. In some embodiments, the set is subset of a group of quantum gates. In some embodiments, the set of basis functions comprises: a set of trigonometric basis functions; a set of polynomial basis functions; or a set of wavelet basis functions. In some embodiments, the approximate fidelity function includes two or more terms of a Fourier, Taylor, or wavelet expansion of a fidelity function of the set of quantum gates on the quantum component. In some embodiments, the quantum component can include a transmon or fluxonium qubit.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which comprise a part of this specification, illustrate several embodiments and, together with the description, serve to explain the principles and features of the disclosed embodiments. In the drawings.

DETAILED DESCRIPTION

Reference will now be made in detail to exemplary embodiments, discussed with regards to the accompanying drawings. In some instances, the same reference numbers will be used throughout the drawings and the following description to refer to the same or like parts. Unless otherwise defined, technical or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

Performance characterization is an important part of the development and validation of quantum computing devices. Performance characterization can be achieved through benchmarking of a quantum computing device, a set of gates on the quantum computing device, or a particular implementation of the set of gates on the quantum computing device. An efficient and reliable benchmarking scheme can enable comparison between different quantum computing devices (e.g., produced by different manufacturers) and can also provide useful feedback information that facilitates device calibration and error diagnosis. Accordingly, such benchmarking can support development of future hardware designs and of fault-tolerant quantum computing.

Figure 1A:
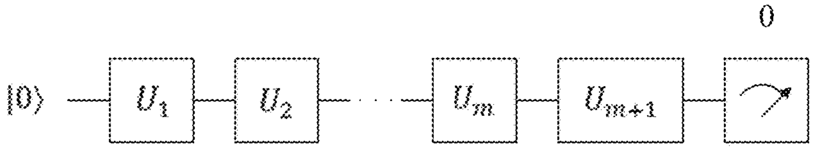
FIG. 1A depicts Fully Randomized Benchmarking (FRB), in accordance with disclosed embodiments.

Benchmarking protocols include randomized benchmarking protocols, which attempt to extract fidelity information about a set of quantum gates while isolating the effect of state preparation and measurement (SPAM) errors. As depicted in FIG. 1A, FRB can be performed using multiple sequences of random gates independently and identically distributed over the group of gates being benchmarked. For each of the multiple sequences a recovery gate can be calculated, the recovery gate being the inverse of the particular sequence of random gates. The quantum computing device can be initialized to a particular state (e.g., state 10)), the particular sequence of random gates and the recovery gate can be applied, and the state of the quantum computing device can be measured.

For a gate sequence of length m, the probability P m of measuring the initial state, a fidelity measure u of the gate set, state preparation error A, and measurement error B, can be related as follows:

$$\mathbb{E}[p_m]=A\cdot u^m+B$$

FRB can include performing sets of trials to estimate $\mathbb{E}[p_m]$ for differing values of m. The value of the fidelity measure u can then be determined by a linear fit of the dependence of the logarithm of $\mathbb{E}[p_m]$ on sequence length m. The fidelity measure u can be standardized into the range [0,1] to generate a gate fidelity $r=1-(1-u)(d-1)/d$, where d is the dimension of the quantum system.

Figure 1B:
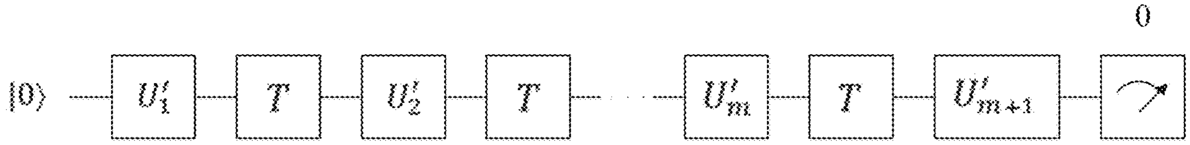
FIG. 1B depicts interleaved Fully Randomized Benchmarking (iFRB), in accordance with disclosed embodiments.

As may be appreciated, the value of u obtained by FRB corresponds to the overall group of gates being benchmarked. In contrast, iFRB can be used to determine a value of a fidelity measure for a particular gate T in the group of gates. As depicted in FIG. 1B, a sequence of m random gates independently and identically distributed over the group of gates can be interleaved with m instances of the gate T. A recovery gate can be calculated, the recovery gate being the inverse of the particular interleaved sequence of random gates and instances of the gate T. The quantum computing device can be initialized to a particular state (e.g., state 10)), the particular sequence of random gates and the recovery gate can be applied, and the state of the quantum computing device can be measured.

Similar to the FRB case, sets of trials can be performed to estimate the expected probability of measuring the initial gate for differing values of m. The value of the fidelity measure v can then be determined by a linear fit of the dependence of the logarithm of the expected probability on m. The fidelity measure for T can then be calculated as the ratio v/u.

Consistent with disclosed embodiments, the fidelity value u can be calculated separately from calculation of the fidelity value v. For example, u can be estimated using FRB, then $v_i$ can be estimated for each gate $T_i$ in a set of i gates using iFRB. A fidelity measure $v_i/u$ can then be calculated for each gate $T_i$ in the set of i gates. The fidelity measure can be standardized into a gate fidelity for the target gate as $$r_T = \frac{(1 - v_i/u)(d-1)}{d},$$

wherein d is the dimension of the quantum system.

Figure 2:
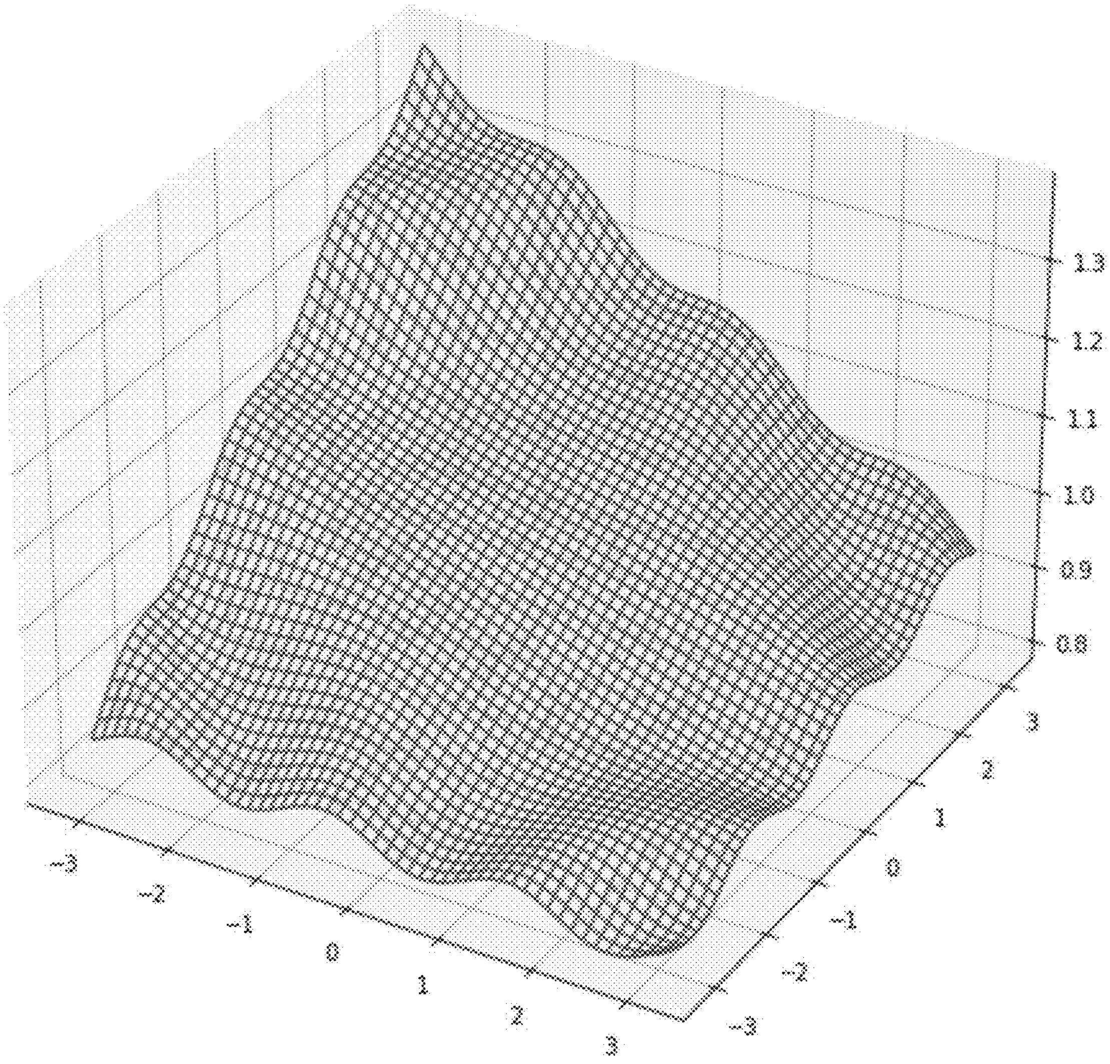
FIG. 2 depicts a hypothetical fidelity function for a set of gates having two input parameters.

FIG. 2 depicts a fidelity function for a hypothetical gate having two input parameters. The fidelity function depends on the values of these two input parameters. The relationship between gate fidelity and input parameter values can be investigated by determining gate fidelity (e.g., using iFRB) for sampled locations in the input domain. FIG. 2 depicts sampling locations in a grid pattern, but the disclosed embodiments are not so limited. Other deterministic or random sampling schemes could be used. As may be appreciated, obtaining an accurate estimation of the relationship between input parameter values and gate fidelity may require an impractical number of trials.

Figure 1C:
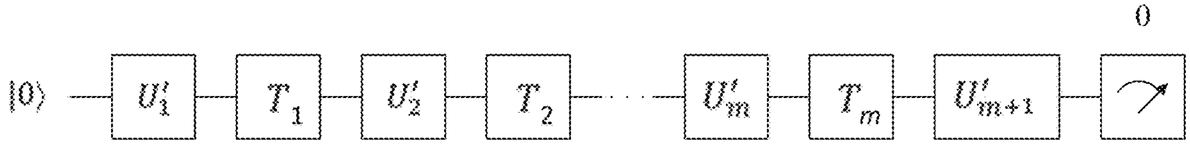
FIG. 1C depicts exemplary interleaved Randomized Benchmarking of a Distribution (iRBD), in accordance with disclosed embodiments.

FIG. 1C depicts interleaved Randomized Benchmarking of a Distribution (iRBD), an improved version of iFRB that enables determination of an approximate fidelity function using a practicable number of trials. Rather than interleaving a first sequence of random gates $$U_1' \text{ to } U_m'$$

with a single gate T, as in conventional iFRB, the first sequence is interleaved with a second sequence of random gates $T_1$ to $T_m$. While the random gates in the first sequence are drawn i.i.d. from a group of gates according to a uniform distribution, the random gates in the second sequence are drawn i.i.d. from a set of gates according to a potentially non-uniform distribution. In some instances, the set of gates can be a subset of the group of gates. In some embodiments, the set of gates and the group of gates can be selected to ensure the existence of a suitable recovery gate. In some embodiments, the potentially non-uniform distribution can be generated using a set of basis functions. Generation of the distribution can include scaling one of the set of basis functions (or a combination of basis functions) to the range [0, 1]. In some embodiments, a set of suitable basis functions restricted to the range [0, 1] may be selected and further scaling may not be required. As with iFRB, multiple trials can be conducted for varying sequence lengths. A fidelity value v can be determined using the results of the multiple trials.

Consistent with disclosed embodiments, the fidelity value v can be a coefficient of the basis function in an expansion of the fidelity function. For example, when the set of basis functions are the sinusoids (or complex exponentials) of the Fourier expansion, the fidelity value for a basis function can be the coefficient of that basis function in a Fourier expansion of the fidelity function. As may be appreciated, the set of basis function can be any suitable set of basis functions and is not limited to trigonometric functions. In some instances, polynomial basis functions may also be used to generate the probability distribution. In such instances, the fidelity value v can be a coefficient in a Taylor or Laurent series approximation of the fidelity function. In various instances, wavelets can be used to generate the probability distribution. In particular, when the shape or characteristics of the fidelity function are generally known or suspected a-priori, a wavelet transform may enable a superior approximation of the fidelity function using fewer terms of the wavelet expansion. Furthermore, wavelets can support approximation of the fidelity function at differing scales and locations, providing a more accurate representation where such accuracy is necessary.

Figure 3:
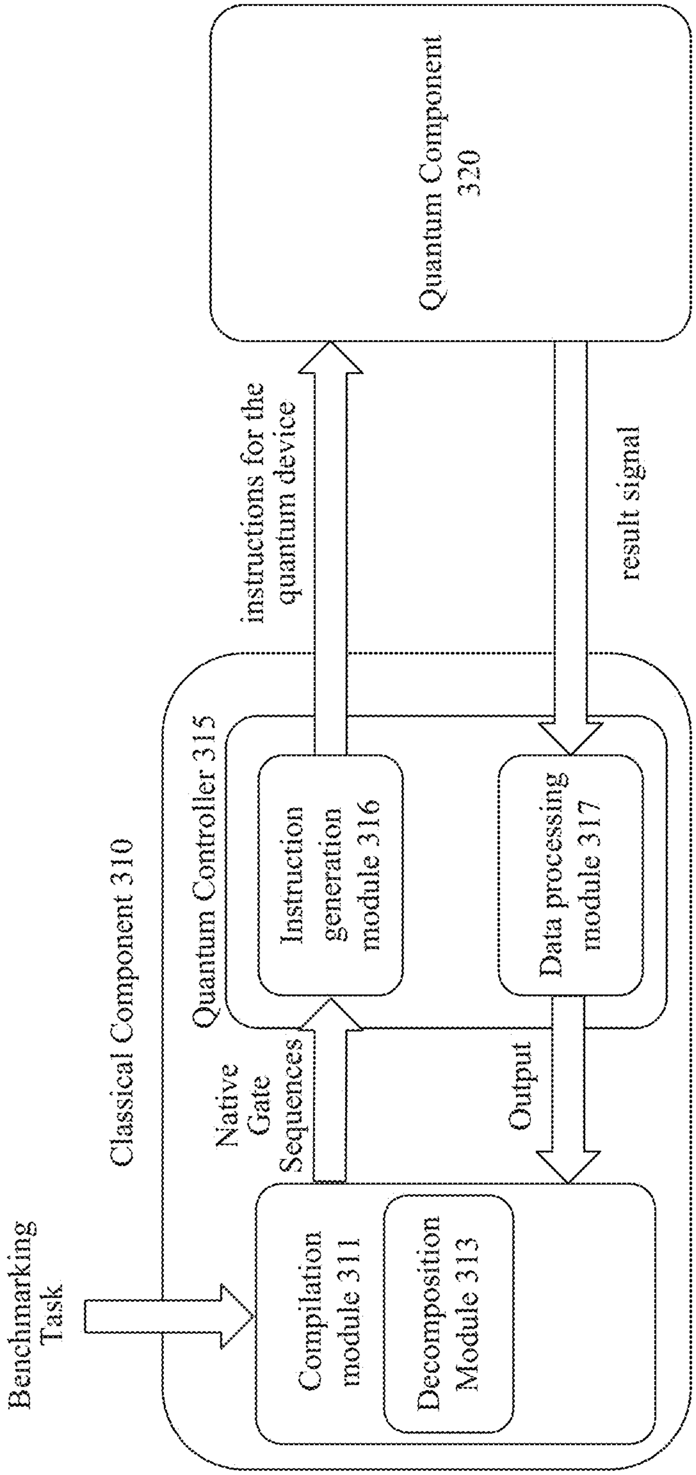
FIG. 3 depicts an exemplary system for decomposing and applying sequences of quantum gates to implement a quantum computation, in accordance with disclosed embodiments.

FIG. 3 depicts a system 300 for performing iRBD, consistent with disclosed embodiments. The system 300 can include a classical component 310 (e.g., a classical computing device, or collection of classical computing devices) and a quantum component 320.

Quantum component 320 can be configured to process information using quantum phenomena (e.g., superposition or entanglement). Quantum component 320 can operate on units of information referred to as "qubits". A qubit is the smallest unit of information in quantum computers, and can have any linear combination of two values, usually denoted $|0\rangle$ and $|1\rangle$. The value of the qubit can be denoted $|\psi\rangle$. Different from a digital bit that can have a value of either "0" or "1," $|\psi\rangle$ can have a value of $\alpha|0\rangle + \beta|1\rangle$ where $\alpha$ and $\beta$ are complex numbers (referred to as "amplitudes") not limited by any constraint except $|\alpha|^2+|\beta|^1$. Qubits can be constructed in various forms and can be represented as quantum states of components of quantum component 320. For example, a qubit can be physically implemented using photons (e.g., in lasers) with their polarizations as the quantum states, electrons or ions (e.g., trapped in an electromagnetic field) with their spins as the quantum states, Josephson junctions (e.g., in a superconducting quantum system) with their charges, current fluxes, or phases as the quantum states, quantum dots (e.g., in semiconductor structures) with their dot spin as the quantum states, topological quantum systems, or any other system that can provide two or more quantum states. Quantum component 320 can apply quantum logic gates (or simply "quantum gates") to create, remove, or modify qubits.

In contrast, classical component 310 can be computing system that cannot perform quantum computations, such as an electronic computer (e.g., a laptop, desktop, cluster, cloud computing platform, or the like). Classical component 310 can operate in digital logic on binary-valued bits. Classical component 310 can include one or more processors (e.g., CPUs, GPUs, or the like), application specific integrated circuits, hardware accelerators, or other components for processing digital logic. Classical component 310 can include one or more memories, buffers, caches, or other components for storing binary values. Classical component 310 can include one or more I/O devices of communicating with other systems, devices (e.g., quantum component 320), users, or the like.

Classical component 310 can be configured to control quantum component 320. The classical component can include a compilation module 311. Compilation module 311 can be configured to obtain a description of a benchmarking task. The description of the benchmarking task can include a description of a group and a set of gates for benchmarking. In some instances, the set of gates can be a subset of the group of gates. The description of the benchmarking task can include a description of a set of basis functions and/or obtain one or more probability distributions for use in benchmarking.

Based on the description of the benchmarking task, compilation module 311 can determine gate sequences for iRBD benchmarking. In some embodiments, the description of the benchmarking task can include a fidelity measure u for the group of gates (e.g., determined as a result of prior benchmarking experiments). When the description of the benchmarking task does not include the fidelity measure u, compilation module 311 can determine gate sequences for FRB benchmarking to determine the fidelity measure u.

Compilation module 311 can determine sets of gate sequences for different sequence lengths m. As described herein, a gate sequence for a sequence length m can include a first sequence of random gates $$U_1'$$

to $$U_m',$$

interleaved with a second sequence of random gates $T_1$ to $T_m$. The random gates in the first sequence can be drawn i.i.d. from the group of gates according to a uniform distribution. The random gates in the second sequence can be drawn i.i.d. from the set of gates according to a probability distribution. In some embodiments, the description of the benchmarking task can indicate the probability distribution (or a basis function for generating the probability distribution). In some embodiments, the compilation module 311 can be preconfigured with the probability distribution (or a basis function for generating the probability distribution). The compilation module 311 can further determine a recovery gate, based on the interleaved first and second sequences of random gates.

As may be appreciated, quantum component 320 can be designed to implement arbitrary quantum gates using a set of native gates. Gate decomposition module 313 (which may be implemented as a submodule of compilation module 311) can be configured to decompose the gate sequences determined by compilation module 311 into sequences of native gates that can be physically implemented on quantum component 320. The sequences of native gates can then be provided to quantum controller 315.

Quantum controller 315 can be configured to directly control quantum component 320. Quantum controller 315 can be a digital computing device (e.g., a computing device including a central processing unit, graphical processing unit, application specific integrated circuit, field-programmable gate array, or other suitable processor). Quantum controller 315 can configure quantum component 320 for computation, provide quantum gates to, and read state information out of quantum component 320.

Quantum controller 315 can include an instruction generation module 316. The capabilities of instruction generation module 316 can depend on the particular implementation of quantum component 320. In some embodiments, instruction generation module 316 can be configured to directly or indirectly provide bias drives to quantum component 320 to enable or disable interactions between qubits. Instruction generation module 316 can indirectly provide bias drives by providing instructions to a bias drive source (e.g., waveform generator or the like), causing the bias drive source to provide the bias drives to quantum component 320. Instruction generation module 316 can apply native quantum gates by providing one or more microwave pulses (or other gate drives) to qubits in quantum component 320. In various embodiments, instruction generation module 316 can implement such gates by providing instructions to a computation drive source (e.g., a waveform generator or the like), causing the computational drive source to provide such microwave pulses (or other gate drives) to qubits in quantum component 320. The microwave pulses can be selected or configured to implement one or more native quantum gates, as described herein. The microwave pulses can be provided to qubits using one or more coils coupled to the corresponding qubits. The coils can be external to quantum component 320 or on a chip implementing quantum component 320.

Quantum controller 315 can be configured to determine state information for quantum component 320. In some embodiments, quantum controller 315 can measure a state of one or more qubits of quantum component 320. The state can be measured upon completion of a sequence of one or more quantum operations. In some embodiments, instruction generation module 316 can provide a probe signal (e.g., a microwave probe tone) to a coupled resonator of quantum component 320, or provide instructions to a readout device (e.g., an arbitrary waveform generator) that provides the probe signal.

In various embodiments, quantum controller 315 can include a data processing module 317. The capabilities of data processing module 317 can depend on the particular implementation of quantum component 320. In some embodiments, data processing module 317 can take the output signal (e.g., electrical/photonic), transform it into discrete signals, and perform data processing on it (e.g., averaging, post-processing) to obtain a computational result. In some embodiments, data processing module 317 can include, or be configured to receive information from, a detector configured to determine an amplitude and phase of an output signal received from the coupled resonator in response to provision of the microwave probe tone. The amplitude and phase of the output signal can be used to determine the state of the probed qubit(s). The disclosed embodiment are not limited to any particular method of measuring the state of the qubits.

Consistent with disclosed embodiments, quantum controller 315 can be configured to provide output to compilation module 311 (or another suitable module of classical component 310. Compilation module 311 (or the other suitable module) can use the output in determining a fidelity measure for the set of gates under the probability distribution (e.g., by accumulating measurements to determine $\mathbb{E}\,[p_m]$, determining v using a function of the empirically estimated $\mathbb{E}\,[p_m]$ on sequence length m, determining the fidelity measure v/u, or determining $$r = \frac{(1 - v/u,)(d-1)}{d}).$$

Quantum component 320 can be configured to receive commands (e.g., bias drives, quantum gates, probe signal, or the like) from the classical component 310. In some embodiments, quantum component 320 can be implemented using a superconducting quantum circuit coupled to quantum controller 315 using at least one microwave drive line. The superconducting quantum circuit can implement multiple qubits (e.g., transmon qubits, fluxonium qubits, or any other suitable type of qubit), consistent with disclosed embodiments. In some embodiments, the superconducting quantum circuit can be realized using one or more chips containing the qubits, each of the chip(s) including at least a portion of the microwave drive line(s) coupling the qubit(s) to quantum controller 315.

Figure 4:
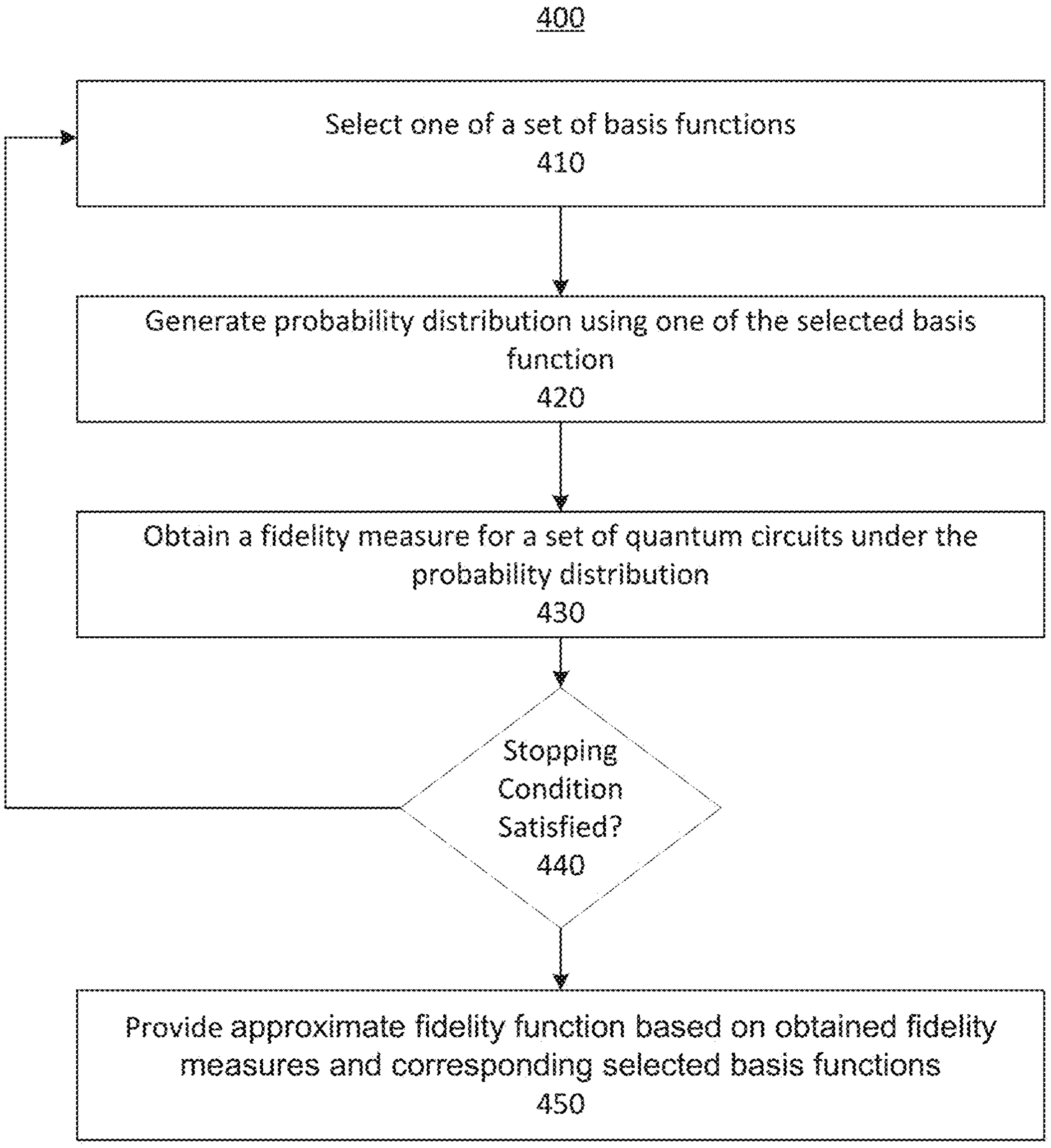
FIG. 4 depicts an exemplary method for performing iRBD, in accordance with disclosed embodiments.

FIG. 4 depicts an exemplary method 400 for performing iRBD, in accordance with disclosed embodiments. In some embodiments, method 400 can be performed using system 300. Method 400 can include operations performed on a classical computing device (e.g., a mobile device, laptop, desktop, workstation, computing cluster, cloud-computing platform, or the like) such as classical component 310. Method 400 can include operations performed on a quantum computing device (e.g., a quantum controller managing a superconducting circuit, trapped ion quantum systems, topological quantum computing systems, photonic quantum computing systems, or the like) such as quantum component 320. An iRBD gate sequence can be generated by the classical computing device. The classical computing device can provide instructions configuring the quantum computing device to apply the gate sequences to an appropriate arrangement of qubits. The quantum computing device can perform the benchmarking by applying the gate sequence. The classical computing device can then provide instructions to the quantum computing device to read out the results of the benchmarking.

Prior to performance of method 400, a set of basis functions can be selected. In some embodiments, the convention computing device can be configured to select the set of basis functions. In some embodiments, the classical computing device can be configured with a predetermined set of basis functions. In various embodiments, the classical computing device can receive or retrieve a set of basis functions (e.g., from another system or through interactions with a user).

Consistent with disclosed embodiments, the classical computing device can select a suitable set of basis functions based on the number of input arguments to the gates, a domain of the input arguments to the gates (e.g., 0 to 2π, −1 to 1, or the like), or characteristics of the fidelity function, which may be known a priori (e.g., whether the fidelity function exhibits some symmetry, that the fidelity function is spherical, that a discontinuity or region of interest occurs in the fidelity function at a particular input value or within a particular input value range, or the like).

In step 410, one of the set of basis functions can be selected, in accordance with disclosed embodiments. In some embodiments, the classical computing device can select the one of the set of basis functions. In various embodiments, the classical computing device can receive an instruction to select one of the set of basis functions. In some embodiments, the set of basis functions can be selected according to a sequence (e.g., the basis function corresponding to the zeroth term of a series expansion can be selected first, followed by the basis function corresponding to the first term of the series expansion, etc.).

In step 420, the classical computing device can generate a probability distribution based on the selected basis function. In some embodiments, generation of the probability transformation can include scaling the basis function into a [0, 1] range. In some embodiments, the generation of the probability distribution can include transforming the domain of the basis function. For example, a domain of the basis function (e.g., a domain 0 to 2π, or the like) can be mapped to a domain of the set of gates being benchmarked (e.g., a domain of −1 to 1, or some other domain). In some embodiments, the basis functions may be complex-valued. In such embodiments, generation of the probability distribution can include conversion of the complex-valued basis functions to real-valued probability distributions (e.g., by truncation of the complex portions of the complex-valued function, use of an amplitude or norm of the basis function, or another suitable method).

In step 430, a fidelity measure for the set of gates under the generated probability distribution can be obtained. The fidelity measure can be obtained as described with regards to FIG. 1C. The classical computing device can be configured to generate sets of trials. Each set of trials can be for a particular sequence length m. Each trial can include initializing a quantum component to a particular state, applying a sequence of gates to the quantum component, applying a recovery gate, and measuring the resulting state of the quantum component. The sequence of gates can include m gates drawn from a group of gates i.i.d. according to a first distribution (e.g., a uniform distribution) interleaved with m gates drawn from a set of gates (e.g., a subset of the group of gates, or the like) i.i.d. according to the generated distribution. The measured states for the set of trials can be used (e.g., by the classical computing device) to estimate a probability of measuring the initial state. The estimated probabilities of measuring the initial state for multiple values of m can be used to determine a fidelity value v, which can be $$\frac{v}{u}).$$

scaled by a fidelity value u for the group of gates (e.g., to obtain me classical computing device can be configured to generate the fidelity value u using FRB or obtain the fidelity value u from a user, another system, or an accessible storage location. In some embodiments, the classical computing device can be configured to transform the scaled fidelity value to the range [0,1] based on a dimension of the quantum component, as described herein.

In step 440, the classical computing device can determine whether a stopping condition has been satisfied. The stopping condition can depend on time, number of fidelity measures generated, a convergence criterion, or any combination of the foregoing. For example, the classical computing device can determine that the stopping condition is satisfied when an elapsed benchmarking time exceeds a predetermined time threshold. As an additional example, the classical computing device can determine that the stopping condition is satisfied when ten fidelity measures have been determined (e.g., corresponding to the first ten basis functions in the selected set of basis functions). As a further example, the classical computing device can determine that the stopping condition is satisfied when a measure (e.g., a norm, metric, or other function) is less than a threshold value. The measure can depend on the term in a series expansion corresponding to the fidelity measure determined in step 430. For example, when the set of basis functions is the Fourier series and the selected basis function is the $4^{th}$ basis function in the Fourier series, the classical computing device can determine that the coefficient of the $4^{th}$ basis function (e.g. the fidelity measure determined in step 440 using the $4^{th}$ basis function) is less than a certain value. For example, the value can be 0.05, indicating that the $4^{th}$ term in the expansion will change the approximate fidelity function by less than 0.05 (e.g., when an amplitude of the $4^{th}$ basis function is less than 1).

Consistent with disclosed embodiments, method 400 can return to step 410 and select another basis function (e.g., the basis function for the next term in the expansion) when the condition is not satisfied. Method 400 can progress to step 450 when the condition is satisfied.

In step 450, the classical computing device can provide the approximate fidelity function, in accordance with disclosed embodiments. Providing the approximate fidelity function can include displaying (e.g., one a graphical user interface associated with the classical computing device), transmitting (e.g., to another system), or storing (e.g., in a storage location accessible to the classical computing device) the fidelity measures determined for each of the basis functions selected. Such fidelity measures can be provided together with an indication of the selected basis functions to which they correspond. Alternatively, such fidelity measures can be provided separate from any indication of the selected basis functions to which they correspond.

While the above describing includes steps of selecting a basis function and generating a probability distribution based on the selected basis function, the disclosed embodiments are not so limited. In some embodiments, the classical computing system can be configured with a predetermines set of probability distributions (e.g., probability distributions corresponding to the first twenty terms of the Fourier series or Taylor series). In such embodiments, rather than selecting a set of basis functions, the classical computing system can be configured to select a set of probability distributions. The set of probability distributions can be selected according to the same criteria described above with respect to selection of the basis functions. For example, the classical computing device can select a suitable set of probability distributions based on the number of input arguments to the gates, a domain of the input arguments to the gates (e.g., 0 to 2π, −1 to 1, or the like), or characteristics of the fidelity function, which may be known a priori (e.g., whether the fidelity function exhibits some symmetry, that the fidelity function is spherical, or the like).

As an example, a set of X-rotations can be benchmarked using method 400. In this example, the $$R_x(\theta) = \exp\left\{\frac{i\theta X}{2}\right\}$$

set of single-qubit gates describe rotations around the x-axis of the Bloch Sphere. A "ground truth" fidelity function of a simulated quantum system is given as:

$$f(\theta) = 0.98 + 0.02 * \exp\left\{\frac{(\theta-\pi)^2}{2}\right\}$$

Method 400 can be performed using the set of basis functions:

$$r_k(\theta) := \begin{cases} \cos\left(\frac{k}{2} * \theta\right), & k \text{ even} \\ \sin\left(\frac{k+1}{2} * \theta\right), & k \text{ odd} \end{cases}$$

A set of probability distributions can be generated from these basis functions as follows:

$$p_k(\theta) = \frac{1}{2\pi}(1 + r_k(\theta))$$

Fidelity measures $\hat{f}_k$ for k≥0 can be generated using iRBD, as described above with regards to FIG. 4. The approximate fidelity function can then be constructed as follows:

$$\hat{f}(\theta) = \hat{f}_0 + \sum_{k>0} 2 * (\hat{f}_k - \hat{f}_0) * r_k(\theta)$$

Figure 5:
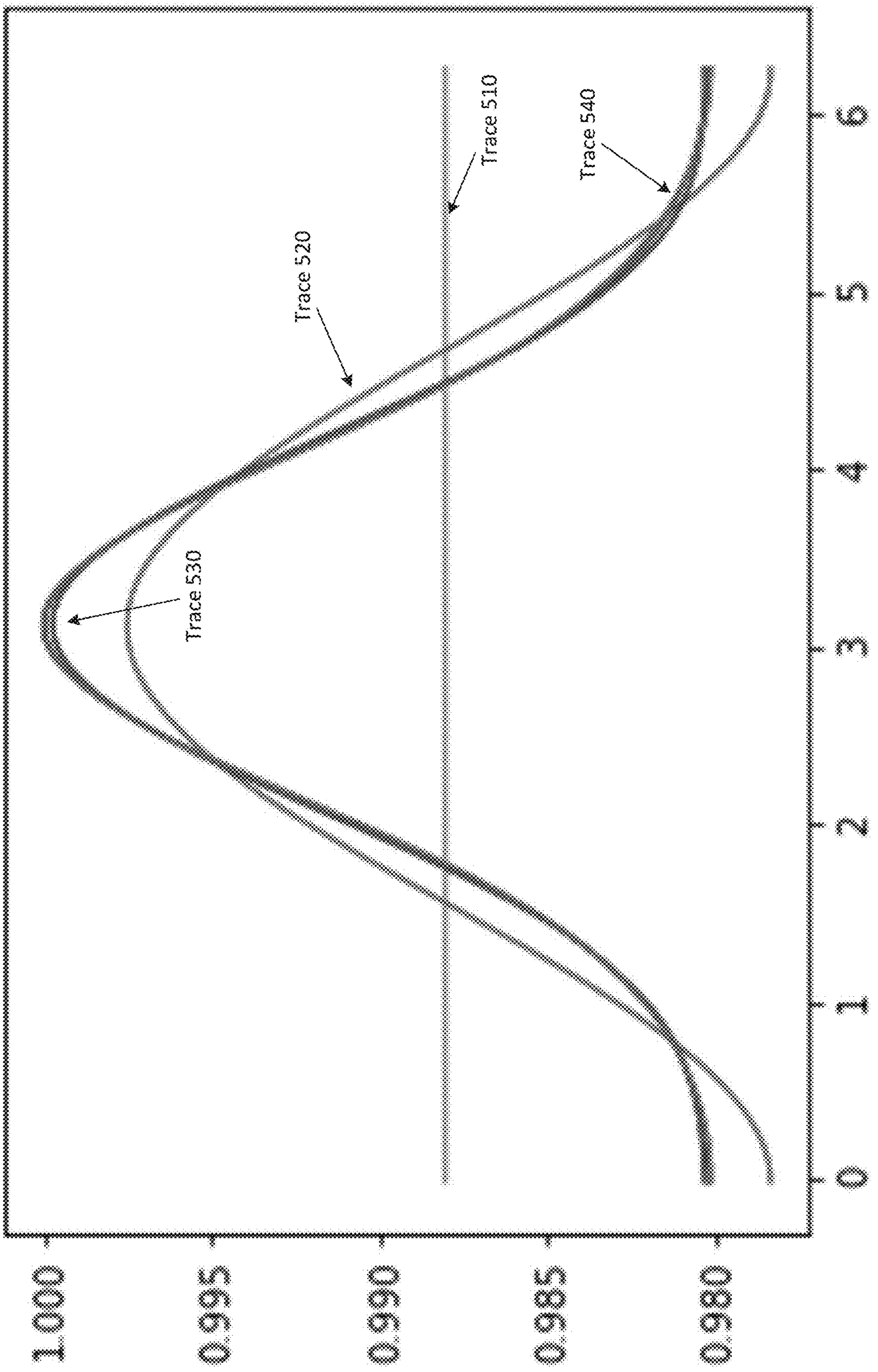
FIG. 5 depicts an example of a sequence of approximate fidelity functions converging on a known fidelity function having one input parameter.

FIG. 5 depicts the first approximate fidelity function for selected ones of the first seven basis functions. The y axis is the fidelity value and the x axis is θ in radians. Trace 510 depicts the values of a first approximate fidelity function (k=0), including only the first constant term of the above series expansion. As may be appreciated, this first approximate fidelity function is merely the average fidelity over the input domain. Trace 520 depicts the values of a second approximate fidelity function (k=2) that includes the values of the first three terms. Trace 530 and 540 depict the values of third (k=4) and fourth (k=6) fidelity functions that include the values of the first five and first seven terms of expansion of the fidelity function. As can be seen, the approximate fidelity function converges quickly on the "ground truth" value of the fidelity function. In this manner, using only iRBD trials, a good approximation of the "ground truth" fidelity function can be obtained over the whole input domain.

As an additional example, a set of spherical harmonic reflection gates can be benchmarked using method 400. In this example, a set of two-input single-qubit gates can have the form:

$$U(\theta,\varphi) := \cos(\theta) * iZ + \sin(\theta) * (\cos(\varphi) * iX + \sin(\varphi) * iY)$$

In this hypothetical example, these gates may have the ground-truth fidelity function:

$$f(\theta,\varphi) = 0.99 + 0.01 * \exp\{-15 * (-1 + 0.6\cos(\theta) + 0.48\sin(\theta)\cos(\varphi) - 0.64\sin(\theta)\sin(\varphi))^2\}$$

The set of basis functions can be selected as:

$$p_{lm}(\theta,\varphi) := \frac{1}{4\pi} + \alpha_{lm} Y_{lm}(\theta,\varphi),$$

where $Y_{lm}$ are the real spherical harmonics and $\alpha_{lm}$ are coefficients such that:

$$p_{lm} \in [0,1]$$

In this example, method 400 can be performed to generate the coefficients $\hat{f}_{lm}$ of the series expansion:

$$\hat{f}(\theta,\varphi) = \hat{f}_{00} + \sum_{l>0} \sum_{|m|<l} \alpha_{lm}^{-1} * (\hat{f}_{lm} - \hat{f}_{00}) * Y_{lm}(\theta,\varphi)$$

Figure 6A:
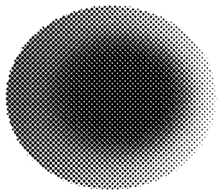
FIGS. 6A to 6D depict an example of a sequence of approximate fidelity functions converging on a known fidelity function having two input parameters.
Figure 6B:
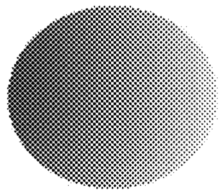
Figure 6C:
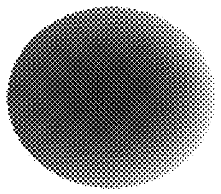
Figure 6D:
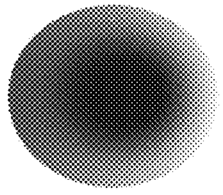

FIG. 6A depicts the ground truth fidelity function, while FIGS. 6B to 6D depict values of the approximate fidelity function for:

$$1 = 0, 2, 4, m = -1, -1+1, \ldots, 1\left(\text{taking}\,\alpha_{lm} = \frac{1}{4\pi}\right).$$

FIG. 6B depicts the valve of the fidelity function for 1=0 (e.g., the $\hat{f}_{00}$ term). FIG. 6C depicts the valve of the fidelity function when 1=2. FIG. 6D depicts the valve of the fidelity function when 1=4. As can be observed, the approximation more closely approaches the ground truth value of FIG. 6A as the number of terms in the fidelity function increases.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

The foregoing descriptions have been presented for purposes of illustration. They are not exhaustive and are not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent gates, modifications, omissions, combinations (e.g., of aspects across various embodiments), adaptations or alterations based on the present disclosure. The gates in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps or inserting or deleting steps.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above-described modules/units may be combined as one module/unit, and each of the above-described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation or restriction of the scope of the embodiments, the scope being defined by the following claims.

What is claimed is:

1. A method of benchmarking a set of quantum gates comprising:

determining an approximate fidelity function for the set of quantum gates, the determination comprising:

obtaining, by a classical component comprising a compilation module and a quantum controller: a selection of a set of basis functions, the basis functions being defined over an input domain, and a selection of the set of quantum gates, the quantum gates being defined over the input domain;

generating at least one first probability distribution defined over the input domain using one of the set of basis functions;

obtaining, by performing randomized benchmarking on a quantum component, a fidelity measure for the set of quantum gates under the at least one first probability distribution, the randomized benchmarking comprising:

determining, by the compilation module, first sequences of quantum gates, each of the first sequences interleaving: a sequence selected from the set of quantum gates according to the at least one first probability distribution defined over the input domain and generated using the one of the set of basis functions, and a sequence selected from the set of quantum gates according to a second probability distribution;

applying, by the quantum controller, the first sequences of quantum gates to the quantum component and measuring, by the quantum controller, resulting state information of the quantum component for the first sequences of quantum gates; and determining the fidelity measure using the resulting state information provided by the quantum controller; and wherein the approximate fidelity function is a function of the fidelity measure and the one of the set of basis functions; and providing the approximate fidelity function.

2. The method of claim 1, wherein: the set of quantum gates is a subset of a group of quantum gates.

3. The method of claim 1, wherein the quantum component comprises at least one of a superconducting circuit, trapped ion quantum system, topological quantum computing system, or photonic quantum computing system.

4. The method of claim 1, wherein the set of basis functions comprises:

a set of trigonometric basis functions;

a set of polynomial basis functions; or a set of wavelet basis functions.

5. The method of claim 1, wherein the quantum component comprises a transmon or fluxonium qubit.

6. The method of claim 1, wherein obtaining the fidelity measure comprises scaling a first fidelity value for an interleaved sequence of quantum gates by a second fidelity value for an un-interleaved sequence of quantum gates.

7. The method of claim 1, wherein the approximate fidelity function comprises two or more terms of a Fourier, Taylor, or wavelet expansion of a fidelity function of the set of quantum gates on the quantum component.

8. The method of claim 1, wherein the input domain includes two or more variables.

9. A system, comprising:

at least one processor; and at least one non-transitory computer-readable medium containing instructions that, when executed by the at least one processor, cause the system to perform operations for benchmarking a set of quantum gates, the operations comprising:

determining an approximate fidelity function for the set of quantum gates, the determination comprising:

obtaining, by a classical component comprising a compilation module and a quantum controller: a selection of a set of basis functions defined over an input domain, and a selection of the set of quantum gates, the quantum gates being defined over the input domain;

generating at least one first probability distribution defined over the input domain using one of the set of basis functions;

obtaining, by performing randomized benchmarking on a quantum component, a fidelity measure for the set of quantum gates under the at least one first probability distribution, the randomized benchmarking comprising:

determining, by the compilation module, first sequences of quantum gates, each of the first sequences interleaving: a sequence selected from the set of quantum gates according to the at least one first probability distribution defined over the input domain and generated using the one of the set of basis functions, and a sequence selected from the set of quantum gates according to a second probability distribution;

applying, by the quantum controller, the first sequences of quantum gates to the quantum component and measuring, by the quantum controller, resulting state information of the quantum component for the first sequences of quantum gates; and determining the fidelity measure using the resulting state information provided by the quantum controller; and wherein the approximate fidelity function is a function of the fidelity measure and the one of the set of basis functions; and providing the approximate fidelity function.

10. The system of claim 9, wherein: the set of quantum gates is a subset of a group of quantum gates.

11. The system of claim 9, wherein the quantum component comprises at least one of a superconducting circuit, trapped ion quantum system, topological quantum computing system, or photonic quantum computing system.

12. The system of claim 9, wherein the set of basis functions comprises:

a set of trigonometric basis functions;

a set of polynomial basis functions; or a set of wavelet basis functions.

13. The system of claim 9, wherein the quantum component comprises a transmon or fluxonium qubit.

14. The system of claim 9, wherein obtaining the fidelity measure comprises scaling a first fidelity value for an interleaved sequence of quantum gates by a second fidelity value for an un-interleaved sequence of quantum gates.

15. The system of claim 9, wherein the approximate fidelity function comprises two or more terms of a Fourier, Taylor, or wavelet expansion of a fidelity function of the set of quantum gates on the quantum component.

16. The system of claim 9, wherein the input domain includes two or more variables.

17. A non-transitory, computer-readable medium containing instructions that, when executed by at least one processor of a system, cause the system to perform operations for benchmarking a set of quantum gates, the operations comprising:

determining an approximate fidelity function for the set of quantum gates, the determination comprising:

obtaining, by a classical component comprising a compilation module and a quantum controller: a selection of a set of basis functions defined over an input domain, and a selection of the set of quantum gates, the quantum gates being defined over the input domain;

generating at least one first probability distribution defined over the input domain using one of the set of basis functions;

obtaining, by performing randomized benchmarking on a quantum component, a fidelity measure for the set of quantum gates under the at least one first probability distribution, the randomized benchmarking comprising:

determining, by the compilation module, first sequences of quantum gates, each of the first sequences interleaving: a sequence selected from the set of quantum gates according to the at least one first probability distribution defined over the input domain and generated using the one of the set of basis functions, and a sequence selected from the set of quantum gates according to a second probability distribution;

applying, by the quantum controller, the first sequences of quantum gates to the quantum component and measuring, by the quantum controller, resulting state information of the quantum component for the first sequences of quantum gates; and determining the fidelity measure using the resulting state information provided by the quantum controller; and wherein the approximate fidelity function is a function of the fidelity measure and the one of the set of basis functions; and providing the approximate fidelity function.

18. The non-transitory, computer-readable medium of claim 17, wherein: the set of quantum gates is a subset of a group of quantum gates.

19. The non-transitory, computer-readable medium of claim 17, wherein the quantum component comprises at least one of a superconducting circuit, trapped ion quantum system, topological quantum computing system, or photonic quantum computing system.

20. The non-transitory, computer-readable medium of claim 17, wherein the set of basis functions comprises:

a set of trigonometric basis functions;

a set of polynomial basis functions; or a set of wavelet basis functions.

21. The non-transitory, computer-readable medium of claim 17, wherein the quantum component comprises a transmon or fluxonium qubit.

22. The non-transitory, computer-readable medium of claim 17, wherein obtaining the fidelity measure comprises scaling a first fidelity value for an interleaved sequence of quantum gates by a second fidelity value for an un-interleaved sequence of quantum gates.

23. The non-transitory, computer-readable medium of claim 17, wherein the approximate fidelity function comprises two or more terms of a Fourier, Taylor, or wavelet expansion of a fidelity function of the set of quantum gates on the quantum component; and the input domain includes two or more variables.

* * * * *